United States Patent [19]

Isaji et al.

[11] Patent Number: 5,537,831
[45] Date of Patent: Jul. 23, 1996

[54] AIR CONDITIONING APPARATUS FOR ELECTRIC AUTOMOBILES

[75] Inventors: Akira Isaji, Nishio; Yuji Takeo, Toyoake; Yuji Ito, Ichinomiya, all of Japan

[73] Assignee: Nippondenso Co., Ltd., Kariya, Japan

[21] Appl. No.: 231,521

[22] Filed: Apr. 22, 1994

[30] Foreign Application Priority Data

Apr. 23, 1993 [JP] Japan ................................. 5-098190
Jul. 21, 1993 [JP] Japan ................................. 5-180501

[51] Int. Cl.$^6$ .................................................. F25B 49/02
[52] U.S. Cl. .......................... 62/228.4; 62/160; 62/228.3; 62/244
[58] Field of Search ..................... 62/228.4, 228.3, 62/160, 229, 215, 208, 209, 323.3, 228.1, 239, 244, 180

[56] References Cited

U.S. PATENT DOCUMENTS

| | | | |
|---|---|---|---|
| 5,295,363 | 3/1994 | Oomura et al. | 62/228.4 X |
| 5,299,431 | 4/1994 | Iritani et al. | 62/243 |
| 5,316,074 | 5/1994 | Isaji et al. | 62/228.4 X |

FOREIGN PATENT DOCUMENTS

| | | |
|---|---|---|
| 1302057 | 12/1989 | Japan. |
| 4151318 | 5/1992 | Japan. |

Primary Examiner—Harry B. Tanner
Attorney, Agent, or Firm—Cushman, Darby & Cushman

[57] ABSTRACT

The air conditioning apparatus for electric automobiles includes a refrigerant cycle having a refrigerant compressor driven by an electric motor, a refrigerant pressure sensor for detecting the high-pressure-side pressure of the refrigerant cycle, and an air conditioner control apparatus. The rotational speed of the electric motor is determined on the basis of a variably controlled frequency. The refrigerant pressure sensor detects the pressure of the refrigerant compressed by the refrigerant compressor and flowing toward the heat exchanger for heating and outputs it to an air conditioner control apparatus. The air conditioner control apparatus controls an inverter on the basis of the value detected by the refrigerant pressure sensor.

11 Claims, 8 Drawing Sheets

AIR CONDITIONING APPARATUS FOR ELECTRIC AUTOMOBILES

BACKGROUND OF THE INVENTION

1. Field of the Invention

The present invention relates to an air conditioning apparatus for electric automobiles capable of varying heating performance by controlling the number of rotations of a refrigerant compressor.

2. Description of the Related Art

In an air conditioning apparatus for electric automobiles, since a heat source for heating cannot be sufficiently secured as in gasoline automobiles, a heat-pump-type refrigerating cycle, in which a cooling operation and heating operation are performed depending on the flow of the refrigerant, is used. Electric automobiles having no internal combustion engine are provided with an electric motor for driving a refrigerant compressor, and control the number of rotations of a refrigerant compressor by controlling the frequency of the electric motor by an inverter.

A method of controlling the number of rotations of the refrigerant compressor has been proposed in which the position of the temperature adjustment lever is adjusted by the vehicle's passenger to correspond to the inverter frequency (Refer to Japanese Patent Laid-Open No. 4-151318). In household air conditioners, the thermal load is determined according to the difference between the current room temperature and the desired room temperature. On the basis of this thermal load, the number of rotations of the refrigerant compressor is controlled.

However, in this method, since feedback control of the number of rotations of the refrigerant compressor is not based upon the actual blowout air temperature, it is not suitable for an air conditioning apparatus for electric automobiles in which blowout air directly strikes the passengers.

Accordingly, it is conceivable that even in the air conditioning apparatus for electric automobiles that an actual blowout air temperature can be detected by a temperature sensor as is performed in a conventional air conditioning apparatus for motor vehicles (an air conditioning apparatus installed in a motor vehicle having an internal combustion engine), and the number of rotations of the refrigerant compressor can be controlled by feedback control so that the detected value of the temperature sensor becomes a desired blowout air temperature (TAO) calculated on the basis of a set value.

In this method, however, since the heat capacity of a heat exchanger for heating is large and the response of the temperature sensor is poor (slow), when the number of rotations of the refrigerant compressor is increased to realize the desired blowout air temperature, the discharge pressure of the refrigerant compressor is increased too much before the desired blowout air temperature is reached. As a result, a high-pressure cut-off switch for detecting a high-pressure-side pressure of the refrigerant compressor is actuated, stopping the operation of the refrigerant compressor.

Since, as described above, the heat capacity of a heat exchanger for heating is large and the response of the temperature sensor is poor, the blowout air temperature with respect to the desired blowout air temperature TAO hunts (See FIG. 10). In particular, when the indoor air volume (air volume fed to a heat exchanger for heating) during a heating operation is varied or when the desired blowout air temperature is varied incident to the changes in the set temperature, the electric current of the inverter varies considerably (hunting), causing the discharge pressure of the refrigerant compressor to vary. Therefore, the blowout air temperature hunts greatly.

SUMMARY OF THE INVENTION

The present invention has been achieved in view of the above-described circumstances. It is an object of the present invention to prevent the hunting of the blowout air temperature and to prevent the high-pressure-side pressure of the refrigerant cycle from increasing to the pressure at which the operation of the refrigerant compressor is stopped.

To achieve the above-described object, according to one aspect of the present invention, there is provided a refrigerant cycle having a duct through which supply air is introduced into the interior of an automobile; a blower for introducing air into the duct and supplying it to the interior of the automobile; a refrigerant compressor for compressing sucked-in refrigerant and discharging it; an indoor heat exchanger, arranged inside the duct, for heating air which passes as a result of heat exchange with the refrigerant at high temperature and high pressure compressed by the refrigerant compressor; number of rotations control means for controlling the number of rotations of the refrigerant compressor to a predetermined number of rotations according to the number of rotations control signal; pressure detecting means for detecting the high-pressure-side pressure of the refrigerant cycle; and number of rotations control signal output means for outputting the number of rotations control signal to the number of rotations control means in accordance with the detected value of the pressure detecting means.

According to another aspect of the present invention, there is provided a blower control means for controlling the number of rotations of the blower, including stopping and starting the blower, when the heating is started, according to the detected value of the pressure detecting means.

The air conditioning apparatus for electric automobiles constructed as described above controls the number of rotations of the refrigerant compressor according to the high-pressure-side pressure of the refrigerant cycle.

Since the high-pressure-side pressure of the refrigerant cycle, namely, the discharged pressure of the refrigerant compressor, can be regarded substantially as the saturation pressure of the indoor heat exchanger, the high-pressure-side pressure of the refrigerant cycle correlates with the saturation temperature (condensing temperature) of the refrigerant corresponding to the saturation pressure. Since the blowout air temperature varies according to the value of the saturation temperature of this refrigerant, it is possible to determine the saturation temperature of the refrigerant on the basis of the desired blowout air temperature in order to determine the saturation pressure corresponding to the saturation temperature, that is, a desired high-pressure-side pressure. Therefore, it is possible to feed back the number of rotations of the refrigerant compressor so that the value detected by the pressure detecting means becomes the desired high-pressure-side pressure, making it possible to obtain the desired blowout air temperature.

The number of rotations of the blower is controlled according to the detected value of the pressure detecting means at heating start time. Therefore, when the detected value of the pressure detecting means is low, that is, the discharge pressure of the refrigerant compressor is low and sufficient heating performance cannot be obtained by the indoor heat exchanger, it is possible to prevent cool air from being blown toward the passenger's feet when heating begins by controlling the number of rotations of the blower so that the volume of air to the indoor heat exchanger is reduced.

The above and further objects and novel features of the invention will be more apparent from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Preferred embodiments of an air conditioning apparatus for electric automobiles of the present invention will be explained below with reference to FIGS. 1 to 8.

Figure 1:
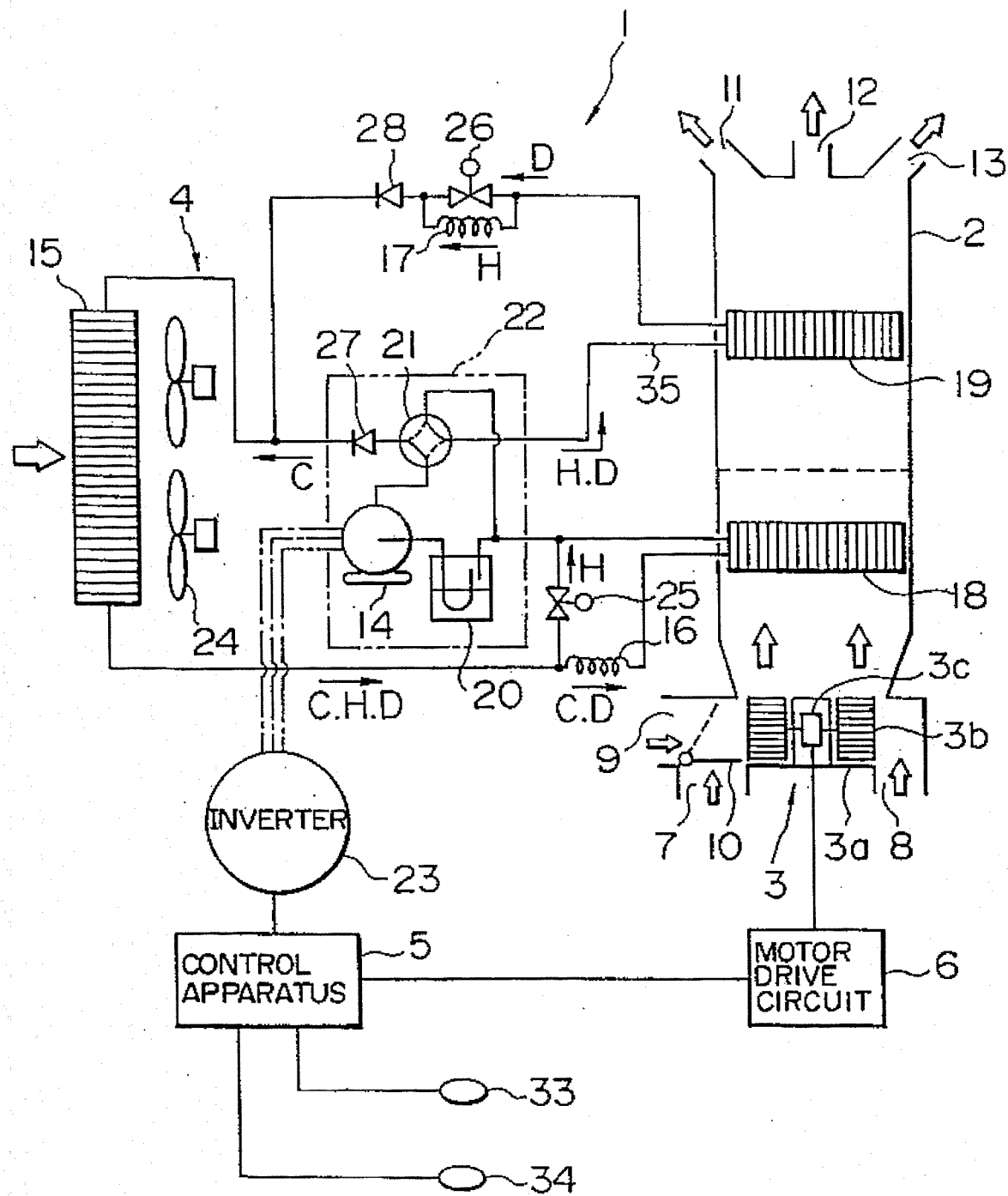
FIG. 1 is a schematic view of the whole air conditioning apparatus for electric automobiles in accordance with a first embodiment of the present invention.
Figure 2:
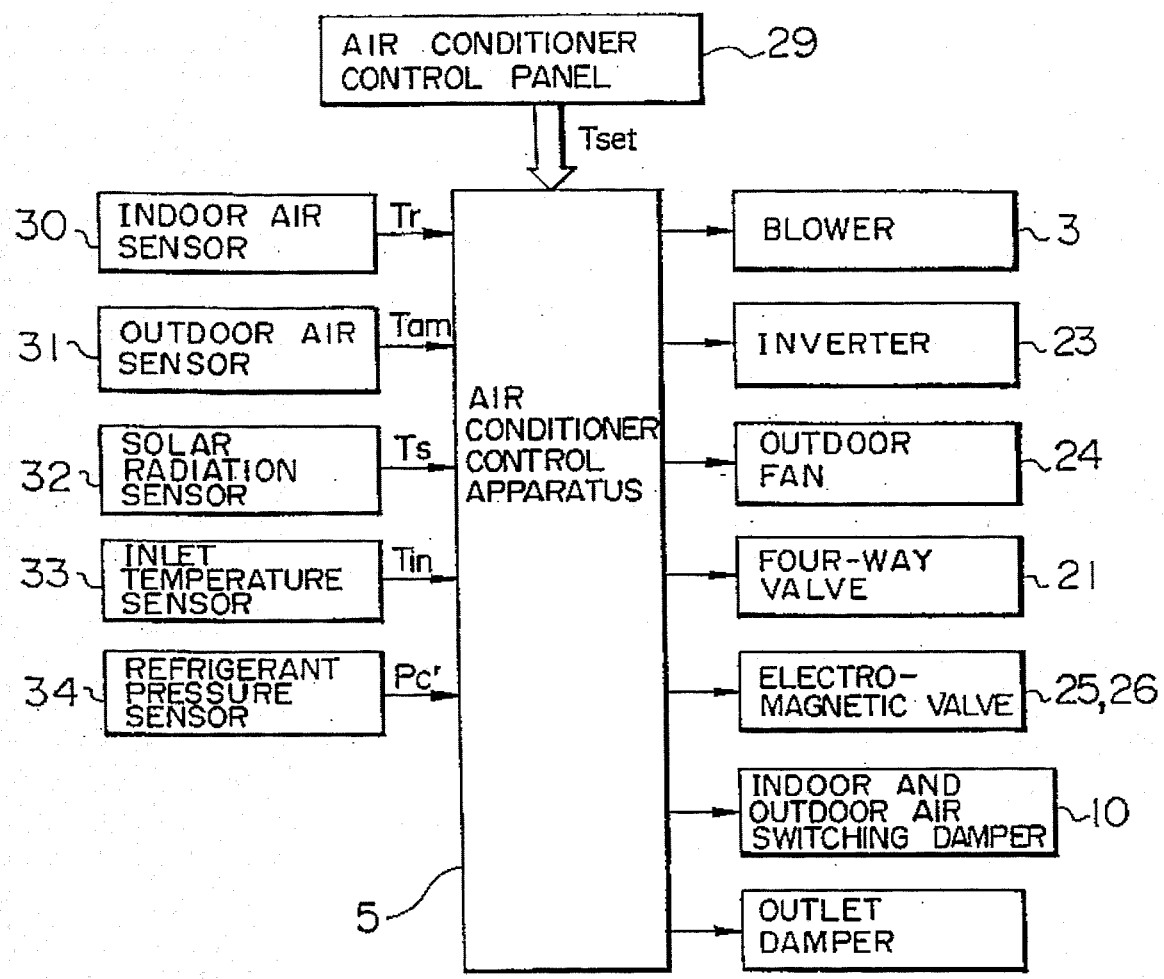
FIG. 2 is a block diagram showing the control of the first embodiment.

FIG. 1 is a schematic view of the whole air conditioning apparatus for electric automobiles.

An air conditioning apparatus 1 for electric automobiles in accordance with the first embodiment includes a duct 2 through which supply air is introduced into an automobile, a blower 3 for introducing air into the duct 2 and supplying it to the interior of the automobile, an accumulator type refrigerant cycle 4, and an air conditioning control apparatus 5.

The blower 3 includes a blower case 3a, an centrifugal fan 3d, and a blower motor 3c. The rotational speed of the blower motor 3c is determined on the basis of the voltage applied to the blower motor 3c. The voltage applied to the blower motor 3c is controlled in accordance with a control signal from the air conditioner control apparatus 5 via a motor drive circuit 6. The blower case 3a is formed with indoor air inlets 7 and 8 for introducing air inside the interior of the automobile (indoor air) and an outdoor air inlet 9 for introducing air outside the automobile (outdoor air), and is provided with an indoor/outdoor air switching damper 10 for adjusting the opening ratio between the indoor air inlet 7 and the outdoor air inlet 9. The indoor air inlet 8 is always opened.

The end of the downstream of the duct 2 is connected to a defroster outlet 11 for discharging supply air toward the front glass of the motor vehicle, a face outlet 12 for discharging supply air toward the upper part of a passenger, and a foot outlet 13 for discharging supply air toward the foot part of the passenger. The outlets 11 to 13 are selectively opened/closed by an outlet switching damper (not shown) which operates in accordance with a blowout mode.

The refrigerant cycle 4 includes a refrigerant compressor 14, an outdoor heat exchanger 15, a pressure reducing apparatus 16 for cooling, a pressure reducing apparatus 17 for heating, a heat exchanger 18 for cooling, a heat exchanger 19 for heating, an accumulator 20, and a passage switching means (described later).

The refrigerant compressor 14 is driven by a built-in electric motor (not shown), and constitutes a compressor unit 22 together with a four-way valve 21 of the passage switching means and the accumulator 20. The rotational speed of the electric motor is determined on the basis of the frequency controlled variably by an inverter 23. Therefore, the refrigerant discharge capacity of the refrigerant compressor 14 varies with the rotational speed of the electric motor.

The outdoor heat exchanger 15, arranged outside the duct 2 (outside the interior of the motor vehicle), exchanges heat between outdoor air and the refrigerant. Receiving the supply air from an outdoor fan 24, the outdoor heat exchanger 15 functions as a refrigerant evaporator during a heating operation and functions as a refrigerant condenser during a cooling operation. The pressure reducing apparatus 16 for cooling reduces the pressure of and expands the refrigerant to be supplied to the heat exchanger 18 for cooling during a cooling operation by employing capillary tubes. The pressure reducing apparatus 17 for heating reduces the pressure of and expands the refrigerant to be supplied to the outdoor heat exchanger 15, capillary tubes being used therein in the same manner as in the pressure reducing apparatus 16 for cooling.

The heat exchanger 18 for cooling functions as a refrigerant evaporator during a cooling operation. Being arranged inside the duct 2, the heat exchanger 18 for cooling cools air passing through the heat exchanger 18 for cooling by exchanging heat between air and the low-temperature and low-pressure refrigerant reduced in pressure and expanded by the pressure reducing apparatus 16 for cooling. The heat exchanger 19 for heating functions as a refrigerant condenser during a heating operation. The heat exchanger 19 for heating, which is arranged downstream (the downwind side) of the heat exchanger 18 for cooling inside the duct 2, heats air passing through the heat exchanger 19 for heating by exchanging heat between the high-temperature and high-pressure refrigerant compressed by the refrigerant compressor 14. The accumulator 20 temporarily stores excess refrigerant within the refrigerant cycle 4, and supplies only the vapor-phase refrigerant, preventing liquid refrigerant from being sucked into the refrigerant compressor 14.

The passage switching means switches the flow of the refrigerant depending upon whether the air conditioning apparatus is performing a cooling operation, heating operation, or dehumidifying operation, which passage switching means includes the four-way valve 21, electromagnetic valves 25 and 26, and check valves 27 and 28. This passage switching means switches the flow of the refrigerant as described below depending upon whether the air conditioning apparatus is performing a cooling, heating or dehumidifying operation.

During the cooling operation, the refrigerant discharged from the refrigerant compressor 14 flows in the following order: the four-way valve 21→the check valve 27→the outdoor heat exchanger 15→the pressure reducing apparatus 16 for cooling→the heat exchanger 18 for cooling→the accumulator 20→and the refrigerant compressor 14 (the flow of the refrigerant during this cooling operation is indicated by the arrow C in FIG. 1).

During the heating operation, the refrigerant discharged from the refrigerant compressor 14 flows in the following order: the four-way valve 21→the heat exchanger 19 for heating→the pressure reducing apparatus 17 for heating→the check valve 28→the outdoor heat exchanger 15→the electromagnetic valve 25→the accumulator 20→and the refrigerant compressor 14 (the flow of the refrigerant during this heating operation is indicated by the arrow H in FIG. 1).

During the dehumidifying operation, the refrigerant discharged from the refrigerant compressor 14 flows in the following order: the four-way valve 21→the heat exchanger 19 for heating→the electromagnetic valve 26→the check valve 28→the outdoor heat exchanger 15→the pressure reducing apparatus 16 for cooling→the heat exchanger 18 for cooling→the accumulator 20→and the refrigerant compressor 14 (the flow of the refrigerant during this dehumidifying operation is indicated by the arrow D in FIG. 1).

The air conditioner control apparatus 5 (See FIG. 2) has a microcomputer (not shown) installed therein, and controls the supply of electricity to the blower 3, the inverter 23, the outdoor fan 24, the four-way valve 21, the electromagnetic valves 25 and 26, the indoor/outdoor air switching damper 10, and electric components such as an actuator (not shown) for driving the indoor/outdoor air switching damper 10 and an outlet switching damper, on the basis of operation signals output from an air conditioner operation panel 29 and detected signals from the sensors (described later).

The sensor includes an indoor air sensor 30 for detecting the temperature $T_r$ of the interior of the vehicle, an outdoor air sensor 31 for detecting the temperature $T_{am}$ of outdoor air, a solar radiation sensor 32 for detecting the amount of solar radiation, an inlet temperature sensor 33 for detecting the suction-side air temperature $T_{in}$ of the heat exchanger 19 for heating, and a refrigerant pressure sensor 34 for detecting the refrigerant pressure (the discharge pressure of the refrigerant compressor 14) Pc' further upstream than the heat exchanger 19 for heating. The inlet temperature sensor 33 is arranged on the upstream side (windward side) of the heat exchanger 19 for heating, and the refrigerant pressure sensor 34 is mounted in a refrigerant pipe 35 which connects the refrigerant compressor 14 to the heat exchanger 19 for heating.

Figure 3:
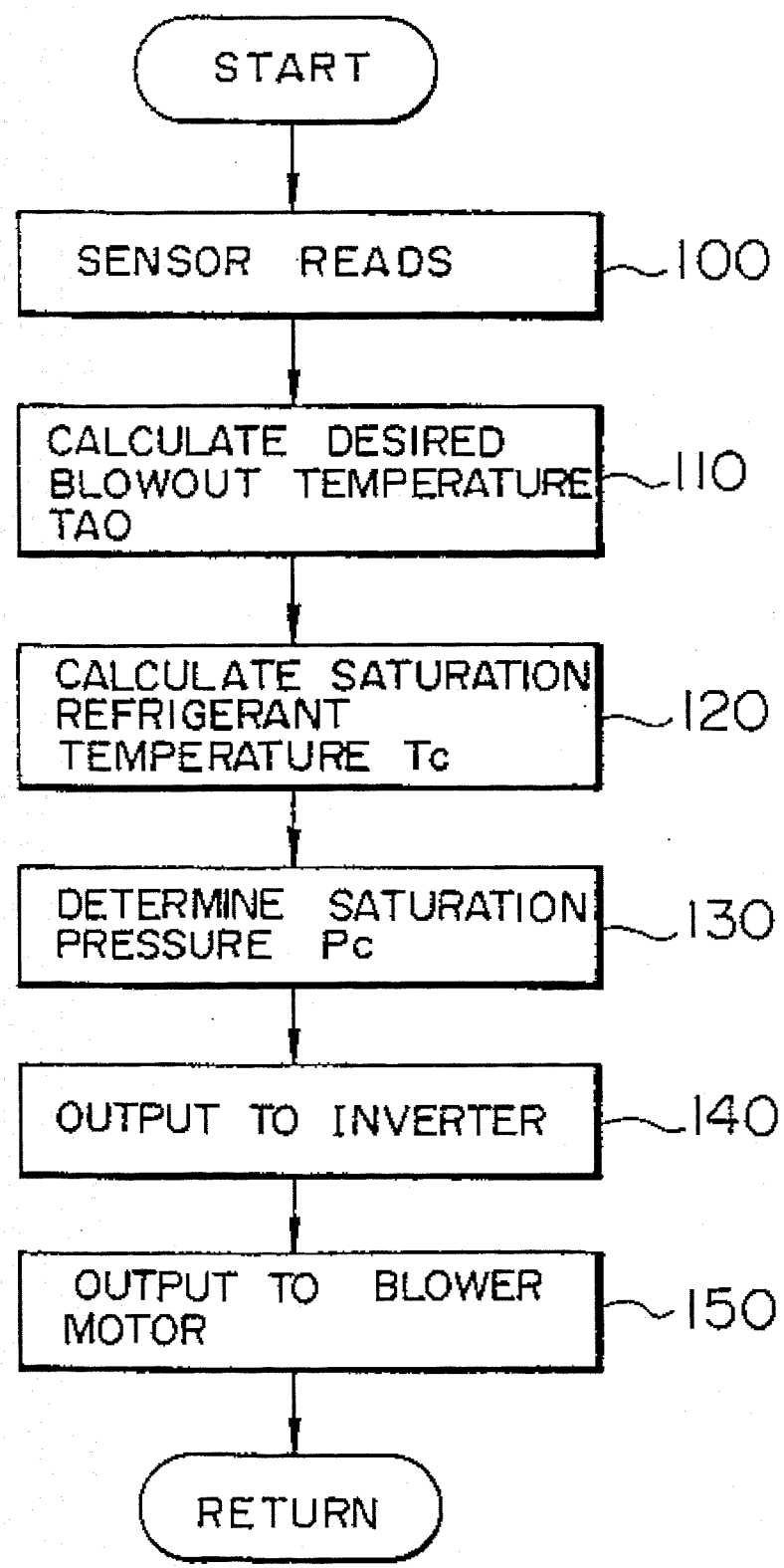
FIG. 3 is a flowchart illustrating the operation of the air conditioning apparatus.
Figure 4:
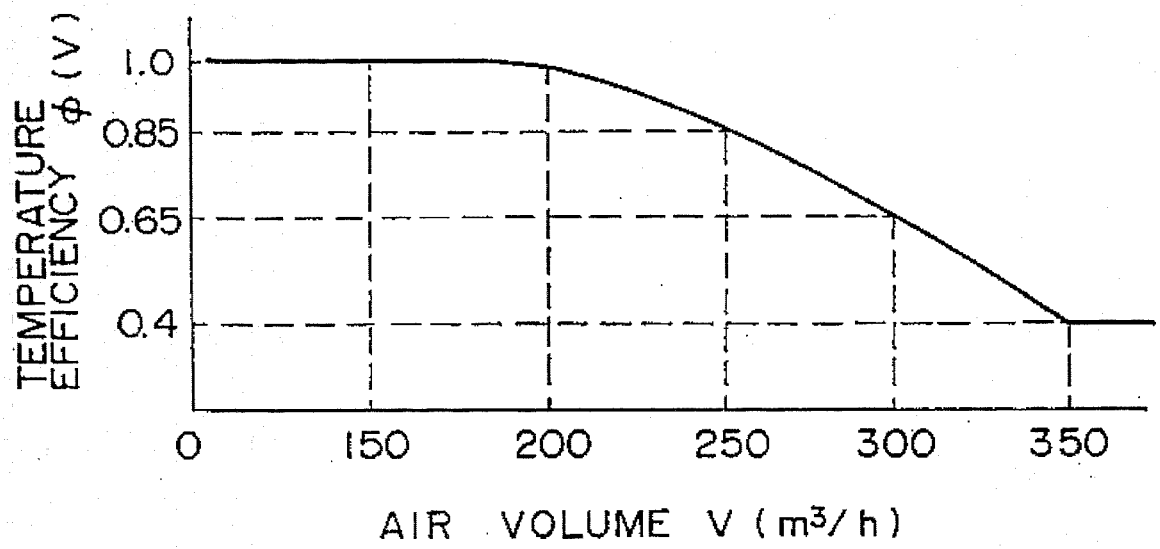
FIG. 4 is a graph illustrating the relationship between the temperature efficiency and air volume of the heat exchanger for heating.

Next, the operation of the air conditioner control apparatus 5 for controlling the number of rotations of the refrigerant compressor 14 during a heating operation will be explained below with reference to the flowchart shown in FIG. 3.

First, the output from each sensor is read (step 100).

Next, the desired blowout air temperature TAO is determined from equation (1) given below on the basis of the set temperature $T_{set}$ of the interior of the vehicle set by the air conditioner operation panel 29, the temperature $T_r$ of the interior of the vehicle, the temperature $T_{am}$ of outdoor air, the amount $T_s$ of solar radiation, all of which are read in step 100 (step 110).

$$TAO = K_{set} \cdot T_{set} - Kr \cdot T_r - K_{am} \cdot T_{am} - K_s \cdot T_s + C \quad (1)$$

where $K_{set}$ is the temperature set gain, Kr is the indoor air temperature gain, $K_{am}$ is the outdoor air temperature gain, $K_s$ is the solar radiation gain, and C is the correction constant.

Next, the saturation refrigerant temperature $T_c$ is determined from the following equation (2) on the basis of the desired blowout air temperature TAO determined in step 110 and the suction-side air temperature $T_{in}$ of the heat exchanger 19 for heating (step 120).

$$T_c = (TAO - T_{in})/\phi(V) + T_{in} \quad (2)$$

where $\phi(V)$ is the temperature efficiency which is dependent on the air volume V of the blower 3, and data (See FIG. 4) indicating the relationship between the temperature efficiency $\phi(V)$, and the air volume V has been previously stored in the microcomputer.

Figure 5:
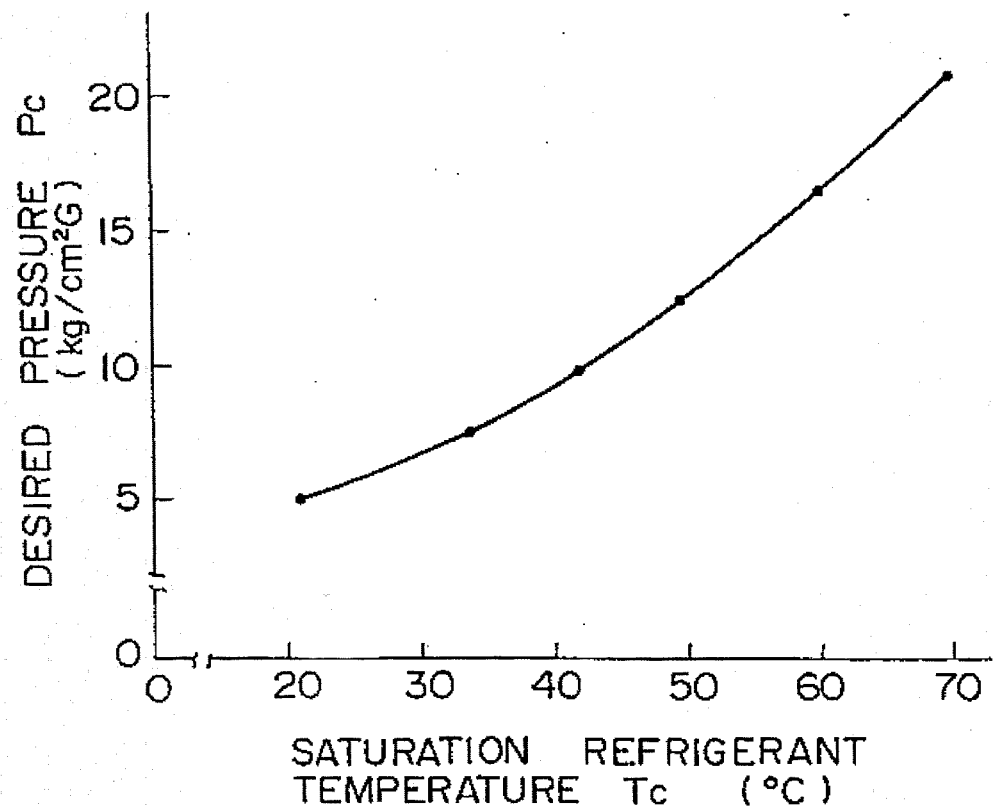
FIG. 5 is a graph illustrating the relationship between the saturation temperature and the saturation pressure of the refrigerant.
Figure 6:
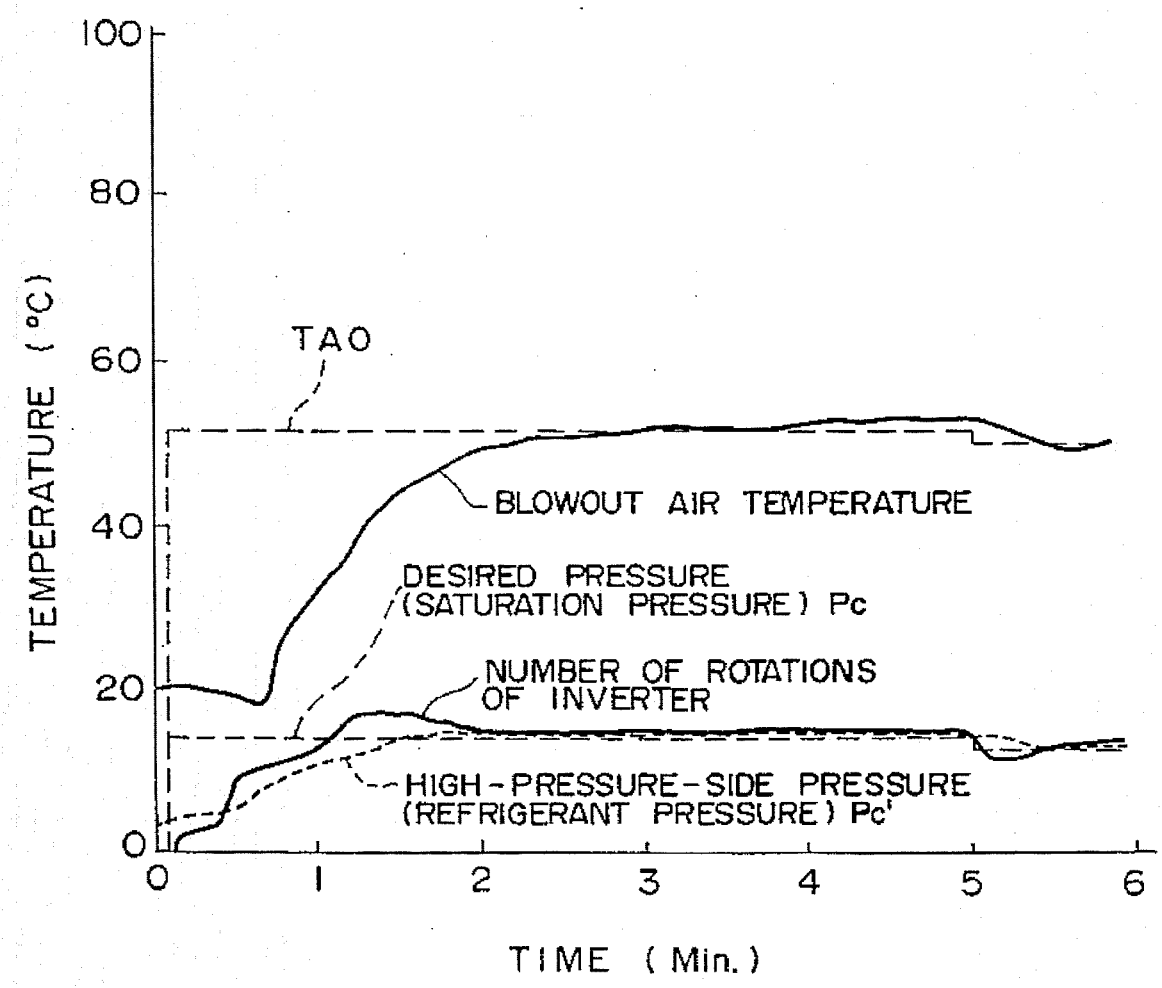
FIG. 6 is a timing chart of an example of control of the first embodiment.

Next, the saturation pressure Pc corresponding to the saturation refrigerant temperature Tc determined in step 120 is determined on the basis of the relationship between the saturation refrigerant temperature Tc and the saturation pressure Pc (the condensing pressure of the heat exchanger 19 for heating), shown in FIG. 5 (step 130). Data shown in FIG. 5 has previously been stored in the microcomputer. This saturation pressure Pc can be regarded substantially as the discharge pressure of the refrigerant compressor 14 (the refrigerant pressure Pc' detected by the refrigerant pressure sensor 34) because a loss in pressure from the refrigerant compressor 14 to the heat exchanger 19 for heating is small.

Therefore, the saturation refrigerant temperature (the condensation temperature) Tc determined in step 120 can be obtained by controlling the number of rotations of the refrigerant compressor 14 so that the discharge pressure of the refrigerant compressor 14 becomes the saturation pressure Pc determined in step 130. The number of rotations of the refrigerant compressor 14 is controlled by outputting a number of rotations control signal to the inverter 23 so that the refrigerant pressure Pc' detected by the refrigerant pressure sensor 34 becomes the saturation pressure Pc determined in step 130 (step 140).

Since, as described above, the number of rotations of the refrigerant compressor 14 is fed back on the basis of the refrigerant pressure Pc' (the discharge pressure of the refrigerant compressor 14) detected by the refrigerant pressure sensor 34, it is possible for the air conditioning apparatus of the present invention to effect a better (quick) response control than a conventional feedback control based on a detected value of a temperature sensor. As a result, when the number of rotations of the refrigerant compressor 14 is increased to realize the desired blowout air temperature TAO, the discharge pressure (Pc') of the refrigerant compressor 14 will not be increased too much before the desired blowout air temperature TAO is reached, and the operation of the refrigerant compressor 14 will not be stopped during the transition time until the temperature $T_r$ of the interior of the vehicle reaches the desired blowout air temperature TAO.

Since, as described above, the response of the refrigerant pressure sensor 34 is good (quick), no delay in response occurs when the number of rotations of the refrigerant compressor 14 is fed back. Therefore, it is possible to prevent the hunting of the blowout air temperature with respect to the desired blowout air temperature TAO (See FIG. 6). During the cooling operation, the number of rotations of the refrigerant compressor 14 may be fed back on the basis of the value detected by the refrigerant pressure sensor 34 in the same way as in the heating operation. However, as in the related art, a method of feeding back the number of rotations of the refrigerant compressor 14 on the basis of the temperature $T_r$ of the interior of the vehicle may be employed.

Figure 7:
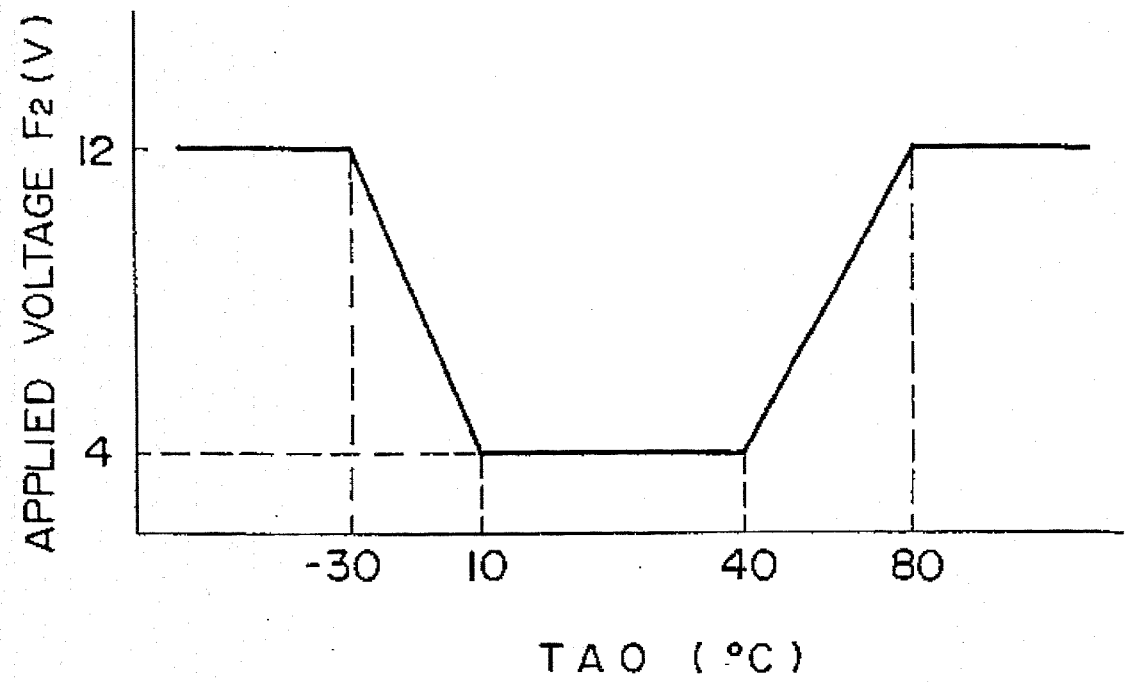
FIG. 7 is a graph illustrating the relationship between the desired blowout air temperature and an applied voltage to a blower motor.

After the above-described step 140 is performed, an applied voltage $F_2$ corresponding to the desired blowout air temperature TAO determined in step 110 is determined on the basis of the relationship between the desired blowout air temperature TAO shown in FIG. 7 and the voltage applied to the blower motor 3c, the applied voltage $F_2$ being output to the blower motor 3c (step 150). Data shown in FIG. 7 has previously been stored in the microcomputer. As a result, during the heating operation where the desired blowout air temperature TAO is high (80° C. or above), the voltage $F_2$ applied to the blower motor 3c becomes a maximum (12 V), so that a large amount of high-temperature wind is supplied to the interior of the motor vehicle and the heating performance becomes a maximum. However, if the voltage $F_2$ applied to the blower motor 3c is controlled on the basis of the applied voltage characteristics shown in FIG. 7 when the heating operation starts, low-temperature wind is blown out toward the passengers' feet because desired heating performance cannot be obtained by the heat exchanger 19 for heating, thus deteriorating the sense of heat.

Figure 8:
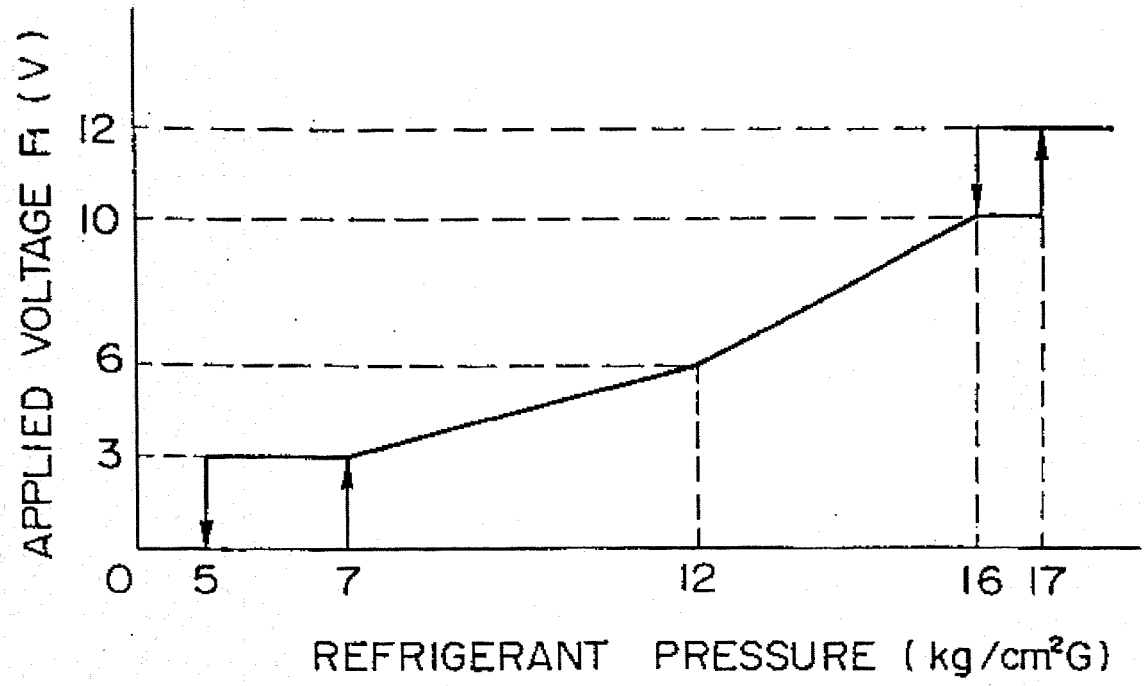
FIG. 8 is a graph illustrating the relationship between the refrigerant pressure and an applied voltage to the blower motor.

Therefore, when heating starts, a voltage $F_1$ applied to the blower motor 3c corresponding to the refrigerant pressure Pc' detected by the refrigerant pressure sensor 34 is determined on the basis of the data shown in FIG. 8. Data shown in FIG. 8 has previously been stored in the microcomputer. As a result, when the refrigerant pressure Pc' is 5 kg/cm² G or less when heating starts, the voltage applied to the blower motor 3c becomes zero, thus causing the blower 3 not to operate.

Thereafter, the condensing pressure in the heat exchanger 19 for heating increases in accordance with an increase in the discharge pressure (the refrigerant pressure Pc') of the refrigerant compressor 14 as a result of controlling the number of rotations of the refrigerant compressor 14 by the inverter 23. When the refrigerant pressure Pc' reaches 7 kg/cm² G, a low voltage of 3 V is applied to the blower motor 3c, thus actuating the blower 3. Thus, a low amount of wind is supplied to the heat exchanger 19 for heating from the blower 3 and then supplied to the interior of the motor vehicle.

Thereafter, when the number of rotations of the refrigerant compressor 14 increases further and the discharge pressure of the refrigerant compressor 14 increases, incident to these increases, the voltage applied to the blower motor 3c is gradually increased to increase the amount of air supplied by the blower 3. As a result, it is possible to prevent cool wind from being blown out toward the passengers' feet when heating starts and to increase the amount of wind supplied in accordance with an increase in the heating performance of the heat exchanger 19 for heating. When, however, the applied voltage $F_2$ determined on the basis of the data shown in FIG. 7 is smaller than the applied voltage $F_1$ determined on the basis of the data shown in FIG. 8 at a heating start time, the applied voltage $F_2$ is applied to the blower motor 3c. In this way, it is possible to control the outlet temperature during the heating operation by the refrigerant cycle 4 (heat pump) on the basis of the refrigerant pressure Pc' without using a special temperature sensor.

The heating start time refers to a period from when the heating starts until a predetermined time (e.g., 10 minutes) has passed, or to a period from when the applied voltage $F_1$ determined on the basis of the data shown in FIG. 8 becomes larger than the applied voltage $F_2$ determined on the basis of the data shown in FIG. 7 ($F_1>F_2$). Therefore, after a predetermined time has passed from when heating started, or after $F_1>F_2$, the applied voltage $F_2$ is determined on the basis of the data shown in FIG. 7.

Figure 9:
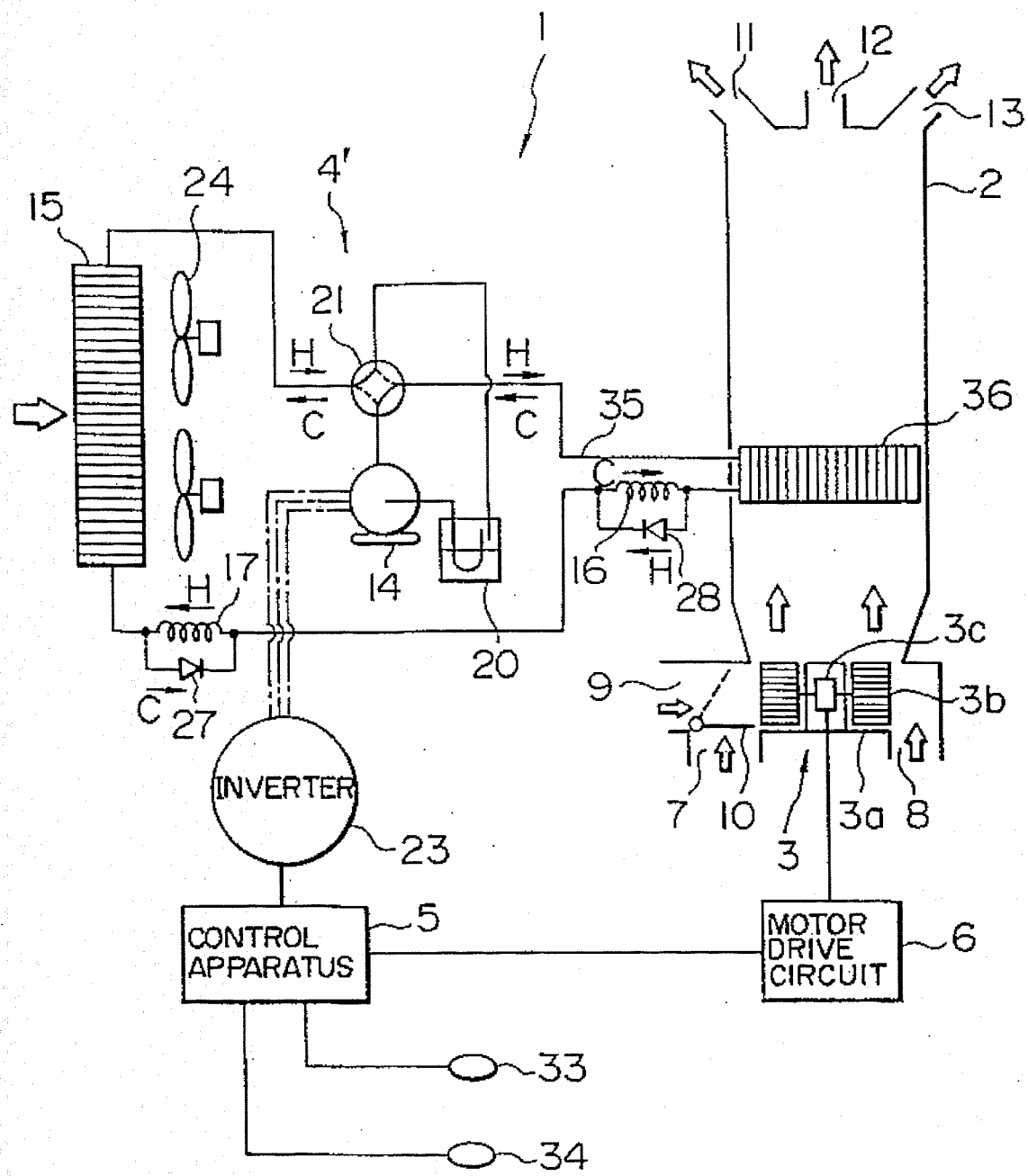
FIG. 9 is a schematic view of the whole air conditioning apparatus for electric automobiles in accordance with a second embodiment of the present invention.
Figure 10:
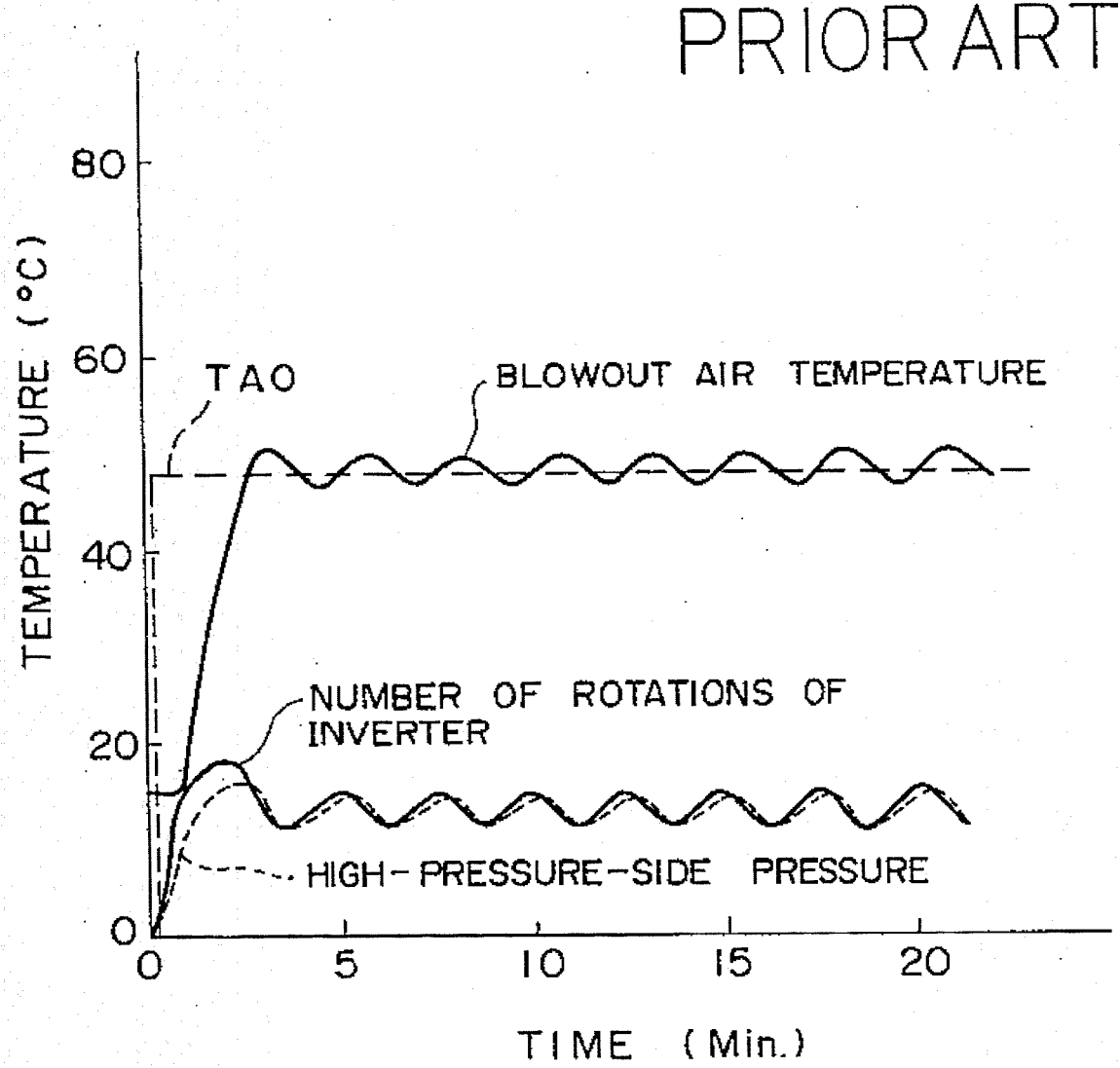
FIG. 10 is a timing chart of an example of control of conventional technology.

FIG. 9 shows the second embodiment of the present invention.

Although in the above-described first embodiment the refrigerant cycle 4 having two indoor heat exchangers (the heat exchanger 18 for cooling and the heat exchanger 19 for heating) arranged inside the duct 2 has been described, in this embodiment, as shown in FIG. 9, a refrigerant cycle 4' is used in which only one indoor heat exchanger 36 arranged inside the duct 2 is used.

The flow of the refrigerant in this embodiment will now be explained.

During the cooling operation, the refrigerant discharged from the refrigerant compressor 14 flows in the following order: the four-way valve 21→the outdoor heat exchanger 15→the check valve 27→the pressure reducing apparatus 16 for cooling→the indoor heat exchanger 36 the four-way valve 21→the accumulator 20→and the refrigerant compressor 14 (the flow of the refrigerant during this cooling operation is indicated by arrows C in FIG. 9).

During the heating operation, the refrigerant discharged from the refrigerant compressor 14 flows in the following order: the four-way valve 21→the indoor heat exchanger 36→the check valve 28→the pressure reducing apparatus 17 for heating→the outdoor heat exchanger 15 the four-way valve 21→the accumulator 20→and the refrigerant compressor 14 (the flow of the refrigerant during this heating operation is indicated by arrows H in FIG. 9).

In this embodiment, as described above, since the single indoor heat exchanger 36 functions as a refrigerant evaporator during the cooling operation and as a condenser during the heating operation, the circuitry of the refrigerant cycle 4' is simplified. The refrigerant pressure sensor 34 is mounted in the refrigerant pipe 35, in which the refrigerant flows from the refrigerant compressor 14 through the four-way valve 21 into the indoor heat exchanger 36 during the heating operation. In the same way as in the first embodiment, the number of rotations of the refrigerant compressor 14 is fed back on the basis of the value detected by the refrigerant pressure sensor 34.

The air conditioning apparatus for electric automobiles in accordance with the present invention is capable of performing good (quick) response control by feeding back the number of rotations of the refrigerant compressor on the basis of the high-pressure-side pressure (the discharge pressure of the refrigerant compressor) of the refrigerant cycle. As a result, even in the transition time until the temperature of the interior of the motor vehicle reaches the desired blowout air temperature, the high-pressure-side pressure of the refrigerant cycle will not, unlike in the prior art, increase to the level of pressure at which the operation of the refrigerant compressor is stopped. Also, since high response control can be performed, it is possible to prevent the hunting of the blowout air temperature.

In addition, since the number of rotations of the blower is controlled on the basis of the value detected by the pressure detecting means when heating starts, it is possible to prevent cool wind from being blown out toward the passengers' feet when heating starts by controlling the number of rotations of the blower so as to reduce the amount of wind to be supplied to the indoor heat exchanger when the discharge pressure of the refrigerant compressor is low and when adequate heating performance cannot be obtained by the indoor heat exchanger.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An air conditioning apparatus for electric automobiles, comprising:
   a duct through which air is introduced into a compartment of an automobile;
   a blower for blowing air into said duct and supplying the air into said compartment;
   a refrigerant cycle having a refrigerant compressor for compressing sucked-in refrigerant and discharging the refrigerant at high temperature and high pressure, and an indoor heat exchanger, arranged inside said duct, for heating air which passes therethrough by exchanging heat between the air and the discharged refrigerant from said refrigerant compressor;
   number of rotations control means for controlling the number of rotations of said refrigerant compressor to a predetermined number of rotations in accordance with a number of rotations control signal;
   pressure detecting means for detecting the high-pressure-side pressure of said refrigerant cycle; and
   number of rotations control signal output means for outputting the number of rotations control signal to said number of rotations control means in accordance with the detected value of the pressure detecting means, wherein said number of rotations control signal output means is an air conditioner control apparatus comprising means for calculating a desired blowout air temperature of air blown out to said compartment; means for calculating a saturation refrigerant temperature based on said desired blowout air temperature; means for calculating a saturation pressure responding to said saturation refrigerant temperature; and means for outputting a number of rotations control signal to said inverter in order that the refrigerant pressure equals to said blowout air temperature.

2. An air conditioning apparatus for electric automobiles according to claim 1, further comprising blower control means for controlling the number of rotations of said blower, including stoppage and starting of operation of said fan, at heating start time, in accordance with the detected value of said pressure detecting means.

3. An air conditioning apparatus for electric automobiles according to claim 2, wherein said refrigerant cycle further has an indoor heat exchanger arranged in said duct for cooling air which passes therethrough during a cooling and dehumidifying operations.

4. An air conditioning apparatus for electric automobiles according to claim 3, wherein said refrigerant cycle has an electric motor driving said refrigerant compressor and said number of rotations control means is an inverter for variably controlling a rotational speed of said electric motor by variably controlling a output frequency of said inverter.

5. An air conditioning apparatus for electric automobiles according to claim 4, wherein said refrigerant cycle comprises:
   detecting means for detecting refrigerant pressure at an upstream of said indoor heat exchanger for heating.

6. An air conditioning apparatus for electric automobiles, comprising:
   a duct through which air is introduced into a compartment of an automobile;
   a blower for blowing air into said duct and supplying the air into said compartment;
   a refrigerant cycle having a refrigerant compressor for compressing sucked-in refrigerant and discharging the refrigerant at high temperature and high pressure, and an indoor heat exchanger, arranged inside said duct, for heating air which passes therethrough by exchanging heat between the air and the discharged refrigerant from said refrigerant compressor;
   a plurality of sensors for detecting operational conditions of the apparatus; and
   a microprocessor programmed to perform the following steps:
   (a) obtaining output values from each of sensors;
   (b) determining a desired blowout air temperature on the basis of at least some of said output values from said sensors;
   (c) determining a saturation refrigerant temperature on the basis of said desired blowout air temperature and a suction-side air temperature of said heat exchanger;
   (d) determining, on the basis of a relationship between the saturation refrigerant temperature and the saturation temperature, a saturation pressure corresponding to the saturation refrigerant temperature;
   (e) outputting a number of rotations control signal so that a detected refrigerant pressure becomes said determined saturation pressure.

7. An apparatus as in claim 6, wherein
said plurality of sensors comprise:
   an indoor air sensor for detecting as Tr the temperature of the interior of the vehicle;
   an outdoor air sensor for detecting as Tam the temperature of outdoor air;
   a solar radiation sensor for detecting as Ts an amount of solar radiation;
   an inlet temperature sensor for detecting as Tin the suction-side air temperature of the heat exchanger for heating; and
   a refrigerant pressure sensor for detecting as Pc' the discharge pressure of the refrigerant compressor further upstream than said heat exchanger for heating.

8. An apparatus as in claim 6, wherein said saturation refrigerant is determined on the basis of a predetermined temperature efficiency of the blower.

9. An apparatus as in claim 6, wherein said saturation pressure is determined on the basis of a predetermined relationship between the saturation refrigerant temperature and the saturation pressure.

10. An apparatus as in claim 7, wherein:
    said blowout air temperature is determined as TAO from the following equation:

$$TAO = K_{set} \times T_{set} - Kr \times Tr - K_{am} \times T_{am} - K_s \times T_s + C,$$

where $K_{set}$ is the temperature set gain, Kr is the indoor air temperature gain, $K_{am}$ is the outdoor air temperature gain, $K_s$ is the solar radiation gain, and C is a correction constant.

11. An apparatus as in claim 7, wherein said saturation refrigerant temperature is determined as Tc according to the following equation:

$$Tc = (TAO - Tin)/\phi(V) + Tin,$$

where $\phi(V)$ is the temperature efficiency of the blower and is dependent of the air volume of the blower.

* * * * *